United States Patent

[11] 3,529,569

| [72] | Inventor | William F. Stahl<br>Warminster, Pennsylvania |
|---|---|---|
| [21] | Appl. No. | 698,082 |
| [22] | Filed | Nov. 8, 1967<br>Division of Ser. No.<br>494,670, Oct. 11, 1965,<br>now Pat. No. 3,390,697,<br>July 2, 1968. |
| [45] | Patented | Sept. 22, 1970 |
| [73] | Assignee | Honeywell Inc.<br>Minneapolis, Minnesota<br>a corporation of Delaware |

[54] INDICATING APPARATUS
1 Claim, 30 Drawing Figs.

[52] U.S. Cl. ................................................. 116/129
[51] Int. Cl. ..................................................... G01d 13/00
[50] Field of Search ................................. 116/129(Cursory),
129A, 130, 129E,T, 134, 136.5;
137/"m. to a." Digest; 33/204.2

[56] References Cited

UNITED STATES PATENTS

| 2,110,456 | 3/1938 | Wait | 116/129 |
|---|---|---|---|
| 2,747,595 | 5/1956 | Dickey | 137/(MX)UX |
| 3,025,868 | 3/1962 | Jaquith et al. | 137/(MX)UX |
| 3,117,312 | 1/1964 | Watson | 73/387UX |
| 3,126,903 | 3/1964 | Hart et al. | 137/(MX)UX |
| 3,390,697 | 7/1968 | Schmitz et al. | 137/86X |

FOREIGN PATENTS

| 511,742 | 8/1939 | Great Britain | 33/204.2 |
|---|---|---|---|
| 573,916 | 12/1945 | Great Britain | 116/129(A)UX |

*Primary Examiner*—Louis R. Prince
*Assistant Examiner*—Daniel M. Yasich
*Attorneys*—Arthur H. Swanson, John Shaw Stevenson and Lockwood D. Burton ABSTRACT: An indicating apparatus that has (a) a scale; (b) a transparent cover spaced outwardly of the scale and having a stationary opaque index necked band portion which extends across the scale; (c) a pointer that is adapted to move along a path that is between the cover and the scale and which has a first elongated opaque portion that is substantially the same width as the widest portion of the opaque band so that it can be brought into hidden alignment therewith; and (d) a part of an opaque triangular shaped part forming a pointed end of the pointer which can be aligned with and obscured by the necked portion of the index band while a remaining portion of this pointed end remains visible to thereby indicate the existance of the pointer behind the indexing band.

INVENTOR
WILLIAM F. STAHL
BY
John Shaw Stevenson
AGENT.

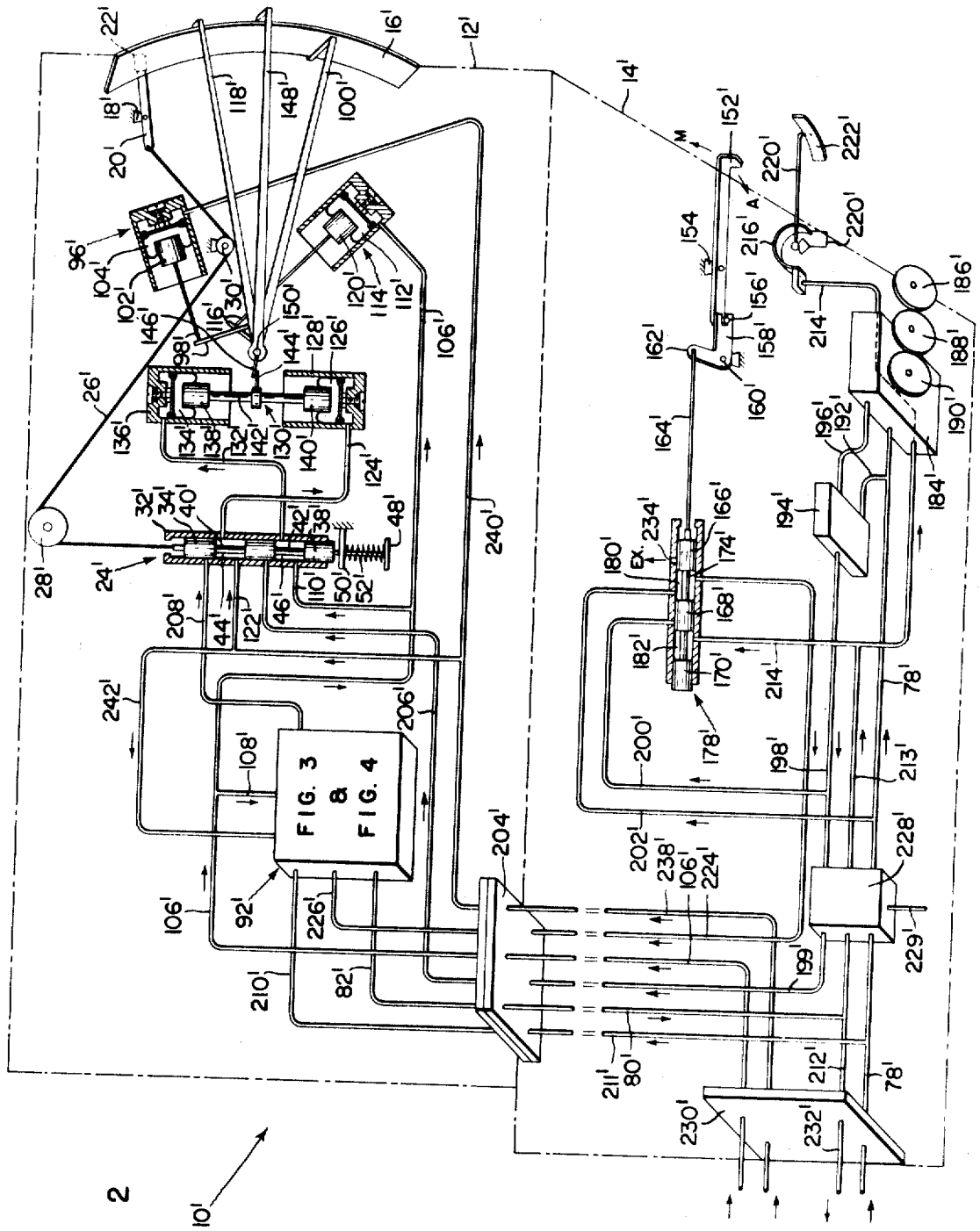

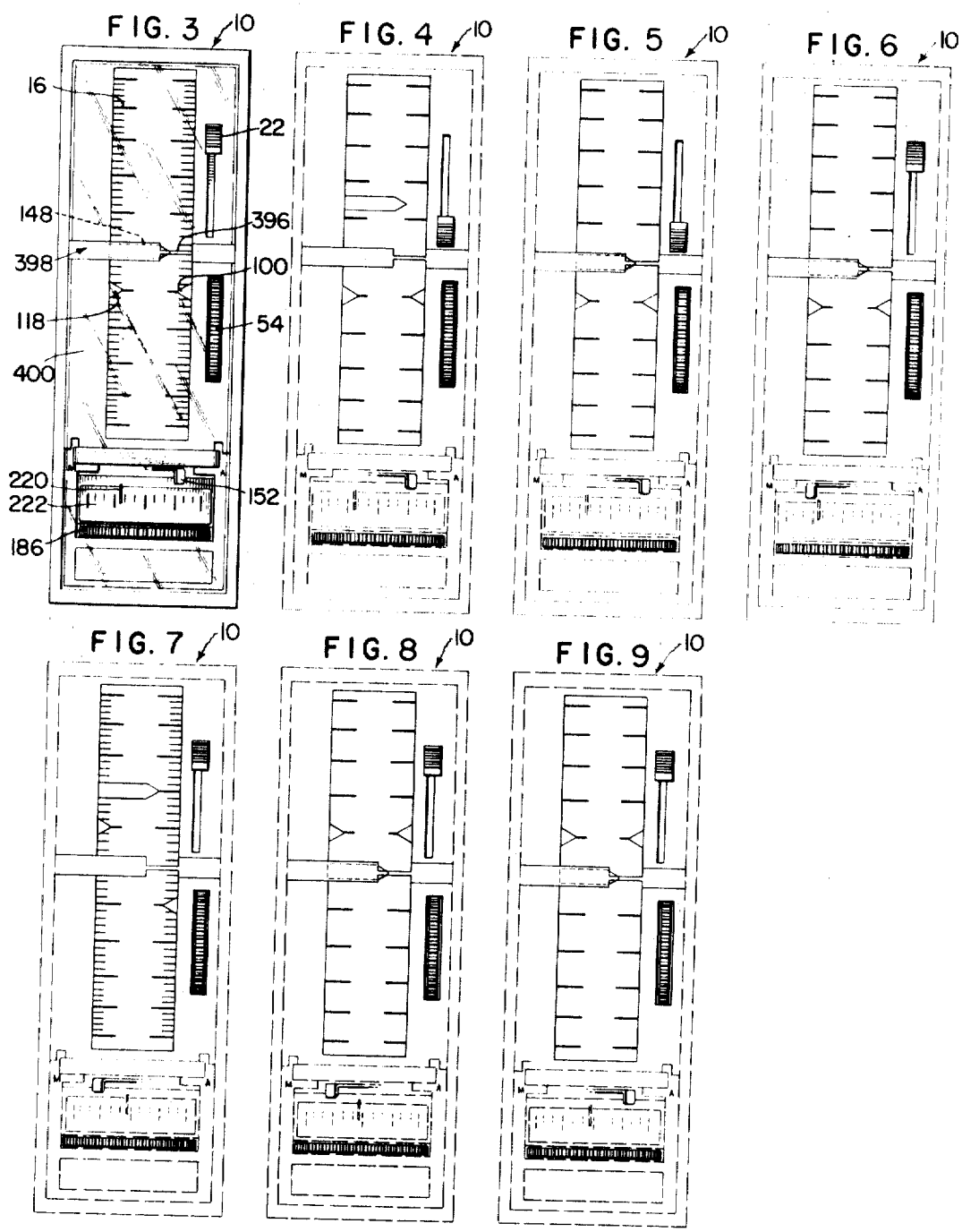

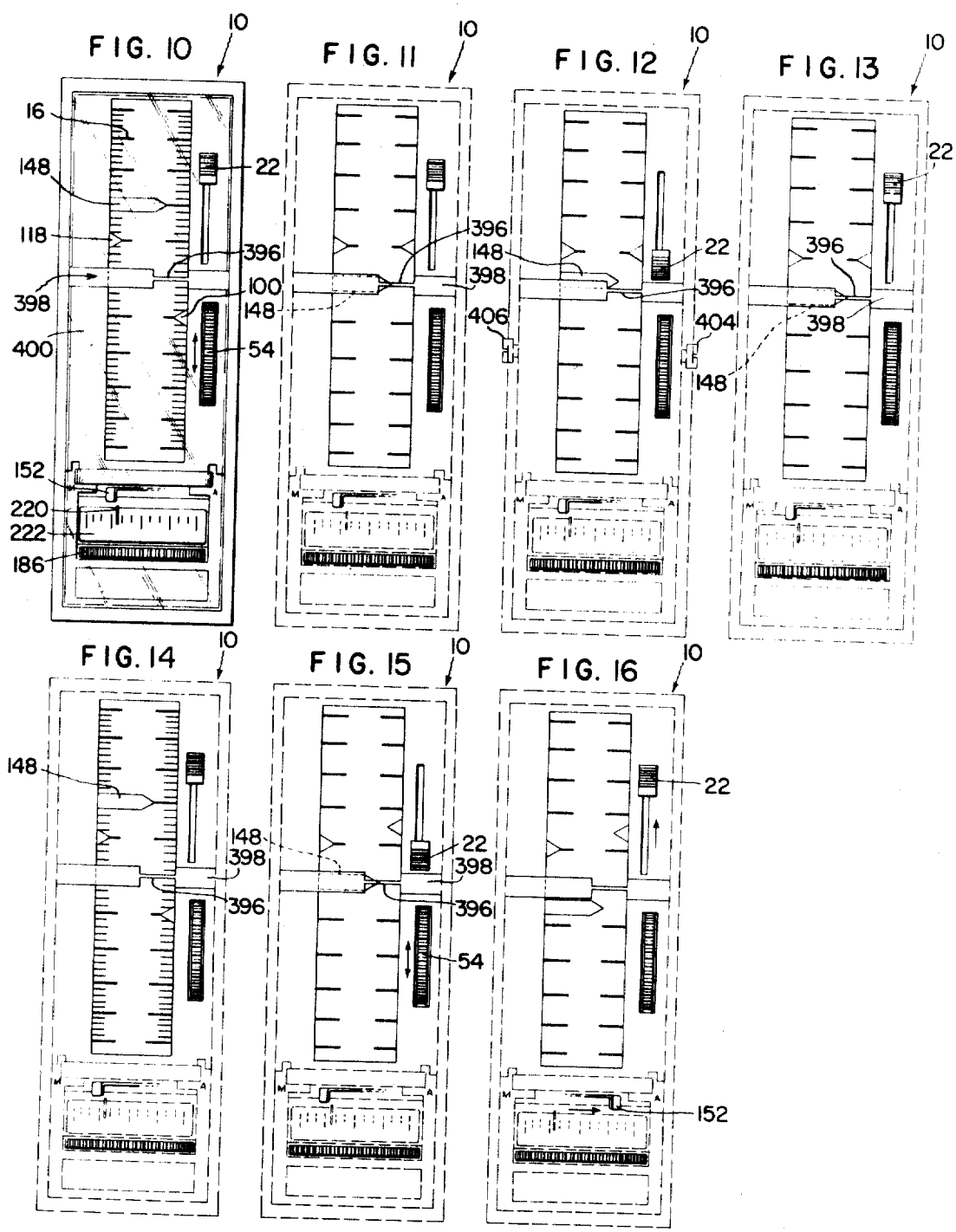

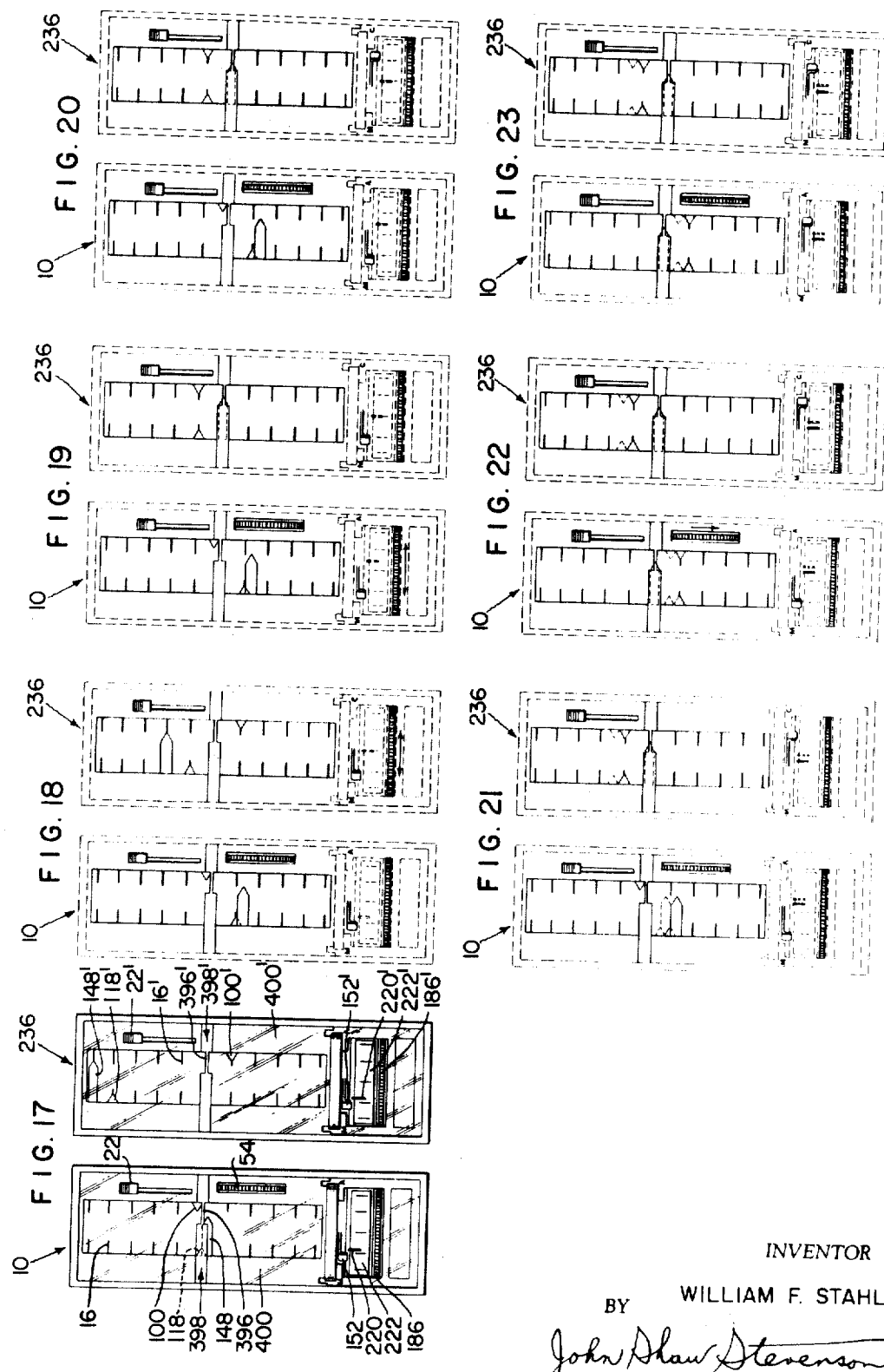

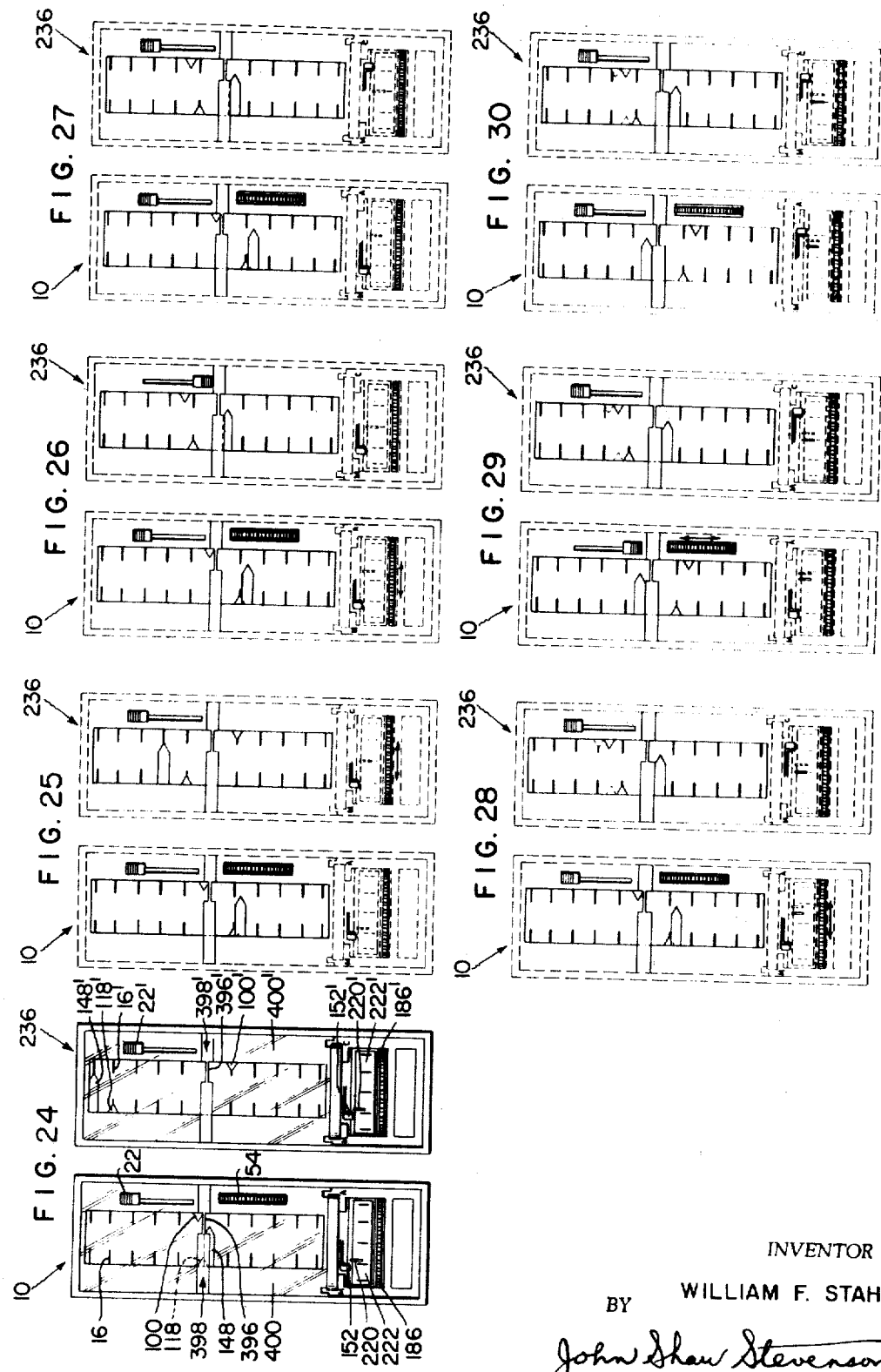

3,529,569

INDICATING APPARATUS

This application is a division of application Ser. No. 494,670, filed Oct. 11, 1965, now U.S. Pat. No. 3,390,697, issued July 2, 1968.

It is an object of the present invention to disclose an apparatus of the aforementioned type that is provided with a nulling lever that can be moved vertically along the front face of an indicating portion of the apparatus to a position in which a deviation pointer will show when offset is present in a thin controller module that forms a portion of the apparatus and which will also readily show when this offset is completely removed during a manual reset or zero adjustment of the controller before an associated bumpless switching lever is shifted from a manual control position to an automatic control position.

It is another object of the present invention to disclose an apparatus that is provided with a vertically positioned nulling lever that can be acuated from the front face of an indicating portion of the primary and secondary indicating-controlling apparatus to a position in which a deviation pointer will show when offset is present in a thin controller module that forms a portion of the apparatus and which will also readily show when this offset is completely removed during a manual reset or zero adjustment of the controller before an associated bumpless switching lever is shifted from a manual control position to the aforementioned secondary automatic control position and/or to a cascade position.

It is another object of the present invention to disclose a fluid-actuated thin vertical scale primary and secondary indicating-controlling apparatus that can readily be directly shifted between a manually regulated control position and a secondary automatic setpoint adjusting control position or a cascade control position and vice versa without the occurrence of a bump and without being required to pass through a pressure balancing sealed position during a time in which the controller has no offset.

It is still another object of the present invention to disclose an apparatus of the aforementioned type that is provided with a nulling lever that can be moved vertically along the front face of the indicating portion of the primary and secondary indicating-controlling apparatus to a position in which a deviation pointer will show when offset is present in a thin controller module that forms a portion of the apparatus and which will also readily show when this offset is completely removed while making a manual reset or a zero adjustment in the controller while the bumpless switching lever is shifted from a manual control position to the aforementioned secondary automatic control position and then to a cascade position.

It is still another object of the invention to disclose a bumpless switching apparatus of the aforementioned type that can effect a bumpless fluid pressure control switch between a manual and a secondary automatic control position and a cascade position even under an operating condition in which offset is present in the controller.

A better understanding of the present invention may be had from the following detailed description when read in connection with the accompanying drawings in which:

FIG. 1 shows a fluid-actuated, vertical scale, primary indicating-controlling apparatus which can be shifted between a manual and automatic and between an automatic and manual switching position without a bump;

FIG. 2 discloses an additional, secondary, fluid-actuated, vertical scale indicating-controlling apparatus which, together with the primary apparatus disclosed in FIG. 1, is employed to bumplessly switch not only back and forth between a manual-automatic switching position, but also between these positions and a cascade position;

FIG. 3 is a view showing the position in which the deviation setpoint and process variable pointers, spring return vertically positioned null and manual-to-automatic switching levers, setpoint and manually adjusted thumb wheel will be located on the face of the primary indicating-controlling apparatus shown in FIG. 1 when this apparatus is in an automatic control position;

FIG. 4 shows that the first step in bumplessly shifting from automatic to a manual regulator position is to align the deviation indicating pointer with a thin line portion of a fixed index band by pulling down the spring return nulling lever and adjusting the horizontally positioned manual adjustable thumb wheel;

FIG. 5 shows the desired zero deviation position that the deviation pointer will be in with respect to the thin line portion of the index band when the aforementioned lever and thumb wheel adjustments have been completed;

FIG. 6 shows the previously pulled down nulling lever in a released spring returned up position and the horizontally positioned, manually operated switch lever, shifted to its manual control position M and the final position that the primary indicating-controlling apparatus will be in at the incident of time when the bumpless switch from automatic to manual control is completed;

FIG. 7 is a view to illustrate how a setpoint process variable pointer deviation condition can be corrected when the primary indicating-controlling apparatus is on manual control and manual control is being effected by rotation of the horizontally positioned, manually adjustable thumb wheel;

FIG. 8 shows that the first step in bumplessly switching from manual to automatic control position is to align the deviation indicating pointer with a thin line portion of the fixed index band by adjusting the vertically positioned, manually adjusted thumb wheel when no offset exists in the controller;

FIG. 9 shows the horizontally positioned, manually operated switching lever shifted to its automatic control position A and the final position that the primary indicating-controlling apparatus will be in at the incident of time when the bumpless shift from manual to automatic control is completed;

FIG. 10 shows that the first operation required to eliminate offset in the controller portion of the primary indicating-controlling apparatus shown in FIG. 1 while the control remains on manual control is to adjust the vertically positioned thumb wheel;

FIG. 11 shows that the deviation pointer will be aligned with a thin line portion of the stationary index band as a result of the last-mentioned thumb wheel adjustment;

FIG. 12 shows the vertically positioned nulling lever in a pulled-down position, the amount of controller offset or the amount of the deviation pointer's displacement from the thin line portion of the stationary index band while the nulling lever is in this pulled-down position and the adjusting screws on the opposite sides of the controller are adjusted to eliminate the offset in the controller;

FIG. 13 shows the vertically positioned nulling lever in a released spring returned up position and in a no controller offset condition after the aforementioned screws have been adjusted to eliminate this offset;

FIG. 14 shows the primary indicating-controlling apparatus of FIG. 1 in a manual control position and the deviation pointer out of alignment with the thin line portion of the stationary index band;

FIG. 15 shows the vertically positioned lever in a pulled-down position and the vertically positioned thumb wheel adjusted to align the deviation pointer with the thin line portion of the stationary index band and to, therefore, make the output signal of the controller containing offset equal to the level of the fluid pressure manually produced by the adjustment of a fluid pressure regulator;

FIG. 16 shows a manual-to-automatic, horizontally positioned transfer lever moved to its automatic position and further shows the amount of control offset still remaining in the controller while the aforementioned bumpless switching from manual to automatic operation is effected in going from the lever, pointer and thumb wheel positions shown in FIGS. 12—14;

Figure 1:
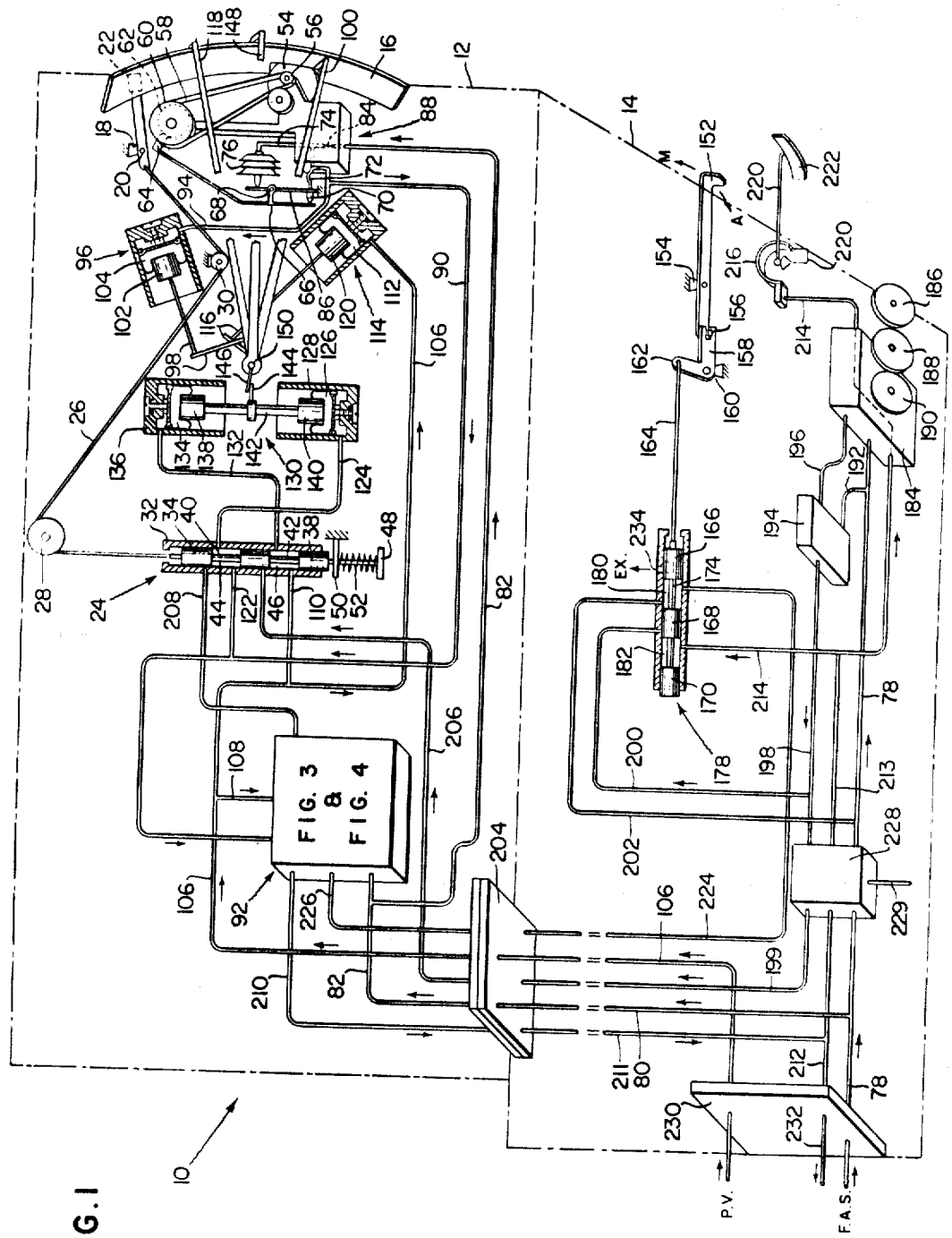

FIG. 17 is a view showing the position in which the nulling, setpoint, process variable pointers, the vertically positioned nulling setpoint manual-to-automatic and manual-to-cascade switching levers and the manually adjustable thumb wheels will be located on the face of the primary and secondary indicating-controlling apparatus shown in FIG. 2 when this apparatus is in a manual position and the controllers have zero offset;

FIG. 18 shows the first step in bumplessly switching from manual to a cascade position is to adjust the horizontally positioned thumb wheel of the secondary controller to give desired process variable value;

FIG. 19 shows the desired zero deviation position that the deviation pointer of the secondary indicating controller will be in with respect to the thin portion of its associated stationary index band after the horizontal thumb wheel of the primary controller has been manually adjusted;

FIG. 20 shows the horizontally positioned, manually operated switching lever of the secondary indicating controller shifted to a cascade position C which provides secondary automatic control with remote setpoint;

FIG. 21 shows in solid-line form the horizontal thumb wheel of the primary indicating controller of FIG. 2 being adjusted while it is in a secondary automatic or FIG. 18 position and an alternative lined-out, dotted-line setpoint process variable pointer position to which the secondary indicating controller can be adjusted if desired while it is in this position by adjusting the vertically positioned setpoint thumb wheel;

FIG. 22 shows the desired zero deviation position that the deviation pointer of the primary indicating controller will be in with respect to a thin portion of its associated stationary index band after the vertical thumb wheel adjustment of the primary controller has been manually adjusted and the dotted-line position of the secondary indicating controller setpoint and process variable pointer represents the alternative position for these pointers referred to under the description of FIG. 19;

FIG. 23 shows the horizontally positioned, manually operated switching lever of the primary indicating controller shifted to an automatic position A and a dotted-line position of the secondary indicating controller setpoint and process variable pointers representing the alternative positions for these pointers referred to under the description of FIG. 19 and the system is in cascade control;

FIG. 24 to FIG. 30 disclose how controls similar to those disclosed in FIGS. 17—23 can be bumplessly switched when offset is present in the controllers.

The fluid-actuated vertical scale primary indicating-controlling apparatus 10 disclosed in FIG. 1 is mounted on an upper panel plate 12 and a lower panel plate 14.

The upper panel plate 12 supports an indicating scale 16 and a stationary support member 18 which carries a pivot 20 on which the nulling lever 22 is mounted. The top end of a multi-spool type nulling switch 24 is shown connected to one end of a flexible cord 26. The cord 26, in turn, is shown wrapped about pulleys 28, 30 and has its other end attached to the left end of the nulling lever 22 for movement therewith.

The nulling switch 24 is comprised of a cylindrical casing 32 containing three cylindrical spools 34, 36, 38 joined together by the shaft portions 40, 42. A first chamber 44 is shown formed between the shaft portion 40 and the inner wall of casing 32 and a second chamber 46 is formed between the shaft portion 42 and the inner wall of casing 32.

An inverted T-shaped member 48 is shown extending slidably through a stationary member 50 from the spool 38 through a stationary member and a spring 52 is employed to retain the spools 34, 36, 38 of the nulling switch 24 in the position shown in FIG. 1 or a position in which the nulling lever 22 is in a non-depressed position.

The upper plate 12 also has mounted thereon a knurled setpoint adjusting disc 54 and a driving pulley 56 fixedly attached for rotation therewith. A belt 58 is shown connecting the driving pulley 56 and a driven pulley 60. A cam 62 is shown mounted for rotation with pulley 60. A follower 64 having a flapper 66 extending therefrom is shown mounted on a movable pivot 68 so that the rotation of the disc 54 in one direction will move the flapper toward the nozzle 70 and rotation of the disc in an opposite direction will move the flapper away from the nozzle 70.

A flexible tube 72 is shown connecting the nozzle 70 by way of a conduit 74 to the interior of the stacked diaphragm feedback chamber 76.

A filtered air supply line (F.A.S.) under pressure is applied from a source (not shown) by way of conduit 78, 80, 82 and restriction 84 to the bleed nozzle chamber 70.

When the disc 54 is turned in the direction to move the flapper 66 toward the nozzle 70 the pressure therein will increase and it will be applied to the feedback diaphragm capsule unit 76. The feedback force unit 76, in turn, will apply a force to the upper end of the flexible leaf spring pivot 86 that will move the floating pivot 68 and the flapper 66 attached thereto away from the nozzle to a force balance position.

The setpoint pressure established by the aforementioned disc 54 adjustment of the parts forming the transmitter 88 is applied by the setpoint pressure transmitting conduit 90 to the controller and cut-off switching unit 92 which will be hereinafter described under the description of FIGS. 3 and 4. Another branch 94 of the conduit 90 applies the setpoint pressure to the fluid-actuated setpoint rolling diaphragm receiver 96. A suitable bell crank linkage 98 connected to the setpoint indicating arm and pointer 100 is actuated by the piston 102 of the setpoint receiver as the magnitude of the setpoint pressure applied to the chamber 104 changes.

An inflowing process variable pressure P.V. is applied by way of a conduit 106 and branch conduit 108 to the controller and cut-off switching unit 92. Conduit 106 also has a branch conduit at 110 that is connected to the chamber 46 of the nulling switch 24. The conduit 106 is also connected to the chamber 112 of a process variable receiver 114. A suitable bell crank linkage 116 which is connected for movement with a process variable indicator arm and pointer 118 is actuated by the piston 120 of the process variable receiver 114 as the magnitude of the setpoint pressure applied to the chamber 112 changes.

The setpoint pressure produced in conduit 90 is applied by way of a branch conduit 122 to the chamber 44 of a nulling switch 24 and thence by way of the conduit 124 to a chamber 126 of a fluid pressure actuated deviation receiver 128 which forms a first part of a deviation indicating arm and pointer actuator 130. As previously mentioned, the inflowing process variable pressure P.V. is applied by way of the conduit 106, 110 to the chamber 46 of the nulling switch 24. FIG. 1 also shows the conduit 132 for applying the process variable P.V. pressure in the chamber 46 to a chamber 134 of a second portion of the fluid pressure actuated deviation receiver 136 which forms the second part of the aforementioned deviation indicating arm and pointer actuator 130.

As the magnitude of the aforementioned setpoint S.P. and process variable P.V. pressures in chambers 126, 134 change the position of the rolling diaphragm contacting pistons 138, 140 and their connecting rod 142 will be simultaneously moved in an upward or downward direction an amount that will be the result of the differences of the magnitude of the S.P. and P.V. pressures.

This change in position of the connecting rod 142 is, in turn, transmitted by means of a protuberance 144 to another protuberance 146 in contact therewith that extends from the left end of the deviation indicator arm pointer 148 that is pivotally mounted on the pivot shaft 150.

The lower panel plate 14 is provided with a transfer switch lever 152 shown in its solid-line automatic or A position and in broken-line fashion for its manual M position.

This transfer switch lever 152 is shown pivotally mounted on a stationary support member 154 between its ends and pivotally connected by means of a pin and slide connection 156 to the bell crank link 158. The bell crank link 158 is, in turn, pivotally mounted as shown on a stationary support member 160. The left end of the bell crank link 160 is connected for joint pivotal movement at 162 with the right end of the link 164. The left end of the link 164, in turn, is shown fixedly connected for movement with cylindrical spools 166, 168, 170 shown positioned within a casing 172 which are joined together by the piston rod portions 174, 176 of an automatic-manual (A to M) transfer switch 178.

A first chamber 180 is shown formed between shaft portion 174 and the inner wall of the casing 172 and a second chamber 182 is formed between the shaft portion 176 and the inner wall of the casing 172. The spools 166, 168, 170 will thus be in the position shown in FIG. 1 when the transfer switch 178 is in the automatic A control position.

FIG. 1 also shows a conventional pressure regulator 184 whose fluid pressure output is selectively increased or decreased manually by rotating the gear wheel 186 associated with gear train 188, 190 in the respective clockwise or counter-clockwise direction.

The filtered air supply (F.A.S.) under pressure is fed through the conduit 78 to the pressure regulator 184 and by way of its branch conduit 92 to a booster 194 that is employed to amplify the fluid pressure that the regulator applies to it by way of conduit 196. The amplified output fluid pressure from the booster 194, in turn, is applied by way of conduit 198 and branch conduit 200 and is shown dead-ended by spool 168 at the transfer switch 178. A branch 202 of the filtered air supply (F.A.S.) conduit 78 applies this fluid pressure to chamber 180 of the transfer switch 178. The output pressure from the booster 194 is applied to conduit 198, the branch conduit 199, the quick disconnect unit 204, conduit 206 and as shown dead-ended by spool 36 of the nulling switch 24.

The output fluid controlled pressure produced by the controller and cut-off switching unit 92 is applied to conduit 208 and is shown dead-ended by spool 34 of the nulling switch 24. The last-mentioned fluid control pressure is also applied by way of transmitting conduits 210, 211, 212, 213 and 214 to a chamber 182 of the transfer switch 178, and simultaneously by way of the conduit 214 through the regulator 184 to the Bourdon 216. The Bourdon 216, in turn, is connected by a suitable bell crank linkage 218 to move lever 220 along the control valve indicating scale 222.

Conduit 224, quick disconnect unit 204, and conduit 226 are employed to transmit a fluid pressure supply in chamber 180 as a cut-off signal to the cut-off switch and controller unit 92.

A relief valve which may be of a conventional spring type is employed to exhaust the controller output pressure in conduit 212 to atmosphere by way of exhaust 229 in the event that the filtered air supply pressure in the F.A.S. conduit 78 is lost.

When a shift from an automatic A to manual M position shown in FIG. 1 takes place by moving the actuating lever 152 of the transfer switch 178, the spools 166, 168, 170 are thereby moved to the right of the position shown in FIG. 1, it can be seen that the output fluid pressure signal being produced by the manually adjusted regulator 184 will then be applied by way of the conduits 198, 200 and the transfer valve 176 to the output conduits 214, 213, 212, the manifold 230, conduit 232 and to an automatically regulated fluid control valve, not shown.

In this manner, the automatically regulated fluid pressure control signal being applied to the control valve by the controller and cut-off switching unit 92 will be cut off. Under this manual M position the filtered air supply (F.A.S.) will be dead-ended against the spool 168 and the pressure in the cut-off signal line 224 exhausted to atmosphere by way of the automatic-manual transfer switch chamber and exhaust port 234.

When the right end of the nulling lever 22 is manually depressed, the flexible cable 26 will be pulled and moved in a direction about the pulleys 30, 28 in a direction that will raise the spool 34, 36, 38 of the nulling switch 24 from the position shown.

When the nulling lever 22 is actuated in this manner during a shift to manual, the pressure signal forming the process variable (PV) in conduit 132 will be disconnected form the process variable signal in the conduit 110 and instead will be connected to the conduit 206 containing the manually adjusted pressure signal generated by the adjusting wheel 186 of the pressure regulator 184.

Another change that takes place during the shift of the nulling lever to a manually depressed position is that the setpoint pressure signal and conduit 124 will be disconnected from the setpoint (SP) pressure applied in conduit 122 and the output signal of the controller and cut-off switch unit will instead be connected to the conduit 124 by way of the nulling switch 24.

The secondary indicating apparatus 236 shown in FIG. 2 is employed when it is desired to use the automatic-to-manual primary controlling and cut-off switching apparatus of FIG. 1 in a cascade system.

It can be seen that the only difference that exists between the primary indicating-controlling apparatus 10 shown in FIG. 1 and the secondary indicating-controlling apparatus 236 shown in FIG. 2 is the elimination of the manually adjusted setpoint pressure signal adjusting transmitter 88 of FIG. 1 and the addition of a conduit 238, 240, 242 to transmit the output control signal of FIG. 1 to the receiver 96 so that this control signal can be used in a manner similar to the way the setpoint signal was employed in the setpoint receiver 96 of FIG. 1.

When the controlling-indicating apparatus 10 of FIG. 1 is on manual control, the output fluid pressure from the regulator 184 and its associated booster 194 that is being transmitted to the controller cut-off switch unit 92 will be exhausted to atmospheric pressure by way of exhaust port 234 in the automatic-manual transfer switch 178 shown in FIG. 1.

AUTOMATIC-TO-MANUAL AND MANUAL-TO-AUTOMATIC WITH
NO OFFSET IN THE CONTROLLER (FIGS. 3 TO 9)

FIG. 3 is a view showing the position in which the deviation pointer 148, setpoint pointer 100, process variable pointer 118, spring returned vertically positioned nulling lever 22, manual-to-automatic transfer switching lever 152, the manually adjustable setpoint adjusted thumb wheel 54, the manual regulator adjusted thumb wheel 186, will be located on the face of the primary indicating-controlling apparatus 10 shown in FIG. 1 when this apparatus 10 is in an automatic control position A.

FIG. 4 shows that the first step in bumplessly shifting from automatic A to the manual regulator position M is to align the deviation indicating pointer 148 with a thin line portion 396 of a fixed opaque index band 398 that forms a part of the curved front clear plastic face 400 that is in front of the indicating scale 16 (FIG. 1) and which is shown mounted in the frame 402 that supports the panel plate 12 by pulling down the spring return nulling lever 22 and adjusting the horizontally positioned manual adjustable thumb wheel 186 to perform the aforementioned alignment.

FIG. 5 shows the desired zero deviation position that the deviation pointer 148 will be in with respect to the thin line portion 396 of the index band 398 when the aforementioned lever and thumb wheel 186 adjustments of FIG. 4 have been completed.

FIG. 6 shows the previously pulled down nulling lever 22 in a released spring returned, up position and the horizontally positioned, manually operated switch lever 152 shifted to its manual control position M and the final position that the primary indicating-controlling apparatus 10 will be in at the incident of time when the bumpless switch from automatic A to manual M control is completed.

FIG. 7 is a view to illustrate how a setpoint pointer 100 process variable pointer 118 deviation condition can be corrected when the primary indicating-controlling apparatus 10 is on manual control M and manual control is being effected by rotation of the horizontally positioned, manually adjustable thumb wheel 186.

FIG. 8 shows that the first step in bumplessly switching from manual M to automatic A control position is to align the deviation indicating pointer 148 with a thin line portion 396 of the fixed index band 398 by adjusting the vertically positioned, manually adjusted thumb wheel 54 when no offset exists in the controller.

FIG. 9 shows the horizontally positioned, manually operated switching lever 152 shifted to its automatic control position A and the final position that the primary indicating-controlling apparatus 10 will be in at the incident of time when the bumpless shift from manual M to automatic A control is completed.

REMOVING OFFSET OR ALIGNING THE CONTROLLER WHILE STILL ON MANUAL
(FIGS. 10—13)

FIG. 10 shows that the first operation required to eliminate offset in the controller portion of the primary indicating and controlling apparatus 10 shown in FIG. 1 while the control remains on manual control is to adjust the vertically positioned thumb wheel 54.

FIG. 11 shows that the deviation pointer 148 will be aligned with a thin line portion 396 of the stationary index band 398 as a result of the last-mentioned thumb wheel 54 adjustment.

FIG. 12 shows the vertically positioned nulling lever 22 in a pulled-down position, the amount of controller offset or the amount of the deviation pointer's displacement from the thin line portion 396 of the stationary index band 398 while the nulling lever is in this pulled-down position and the suitable conventional adjusting screws 404, 406 on the opposite sides of the controller are adjusted to eliminate the offset in the controller.

FIG. 13 shows the vertically positioned nulling lever in a released spring returned up position and in a no controller offset condition after the aforementioned screws have been adjusted to eliminate this offset.

BUMPLESS SWITCH FROM MANUAL M TO AUTOMATIC A WITH CONTROLLER HAVING OFFSET (FIGS. 14—16)

FIG. 14 shows the primary indicating-controlling apparatus 10 of FIG. 1 in a manual control M position and the deviation pointer 148 out of alignment with the thin line portion 396 of the stationary index band 398.

FIG. 15 shows the vertically positioned nulling lever 22 in a pulled-down position and the vertically positioned thumb wheel 54 adjusted to align the deviation pointer 148 with the thin line portion 396 of the stationary index band 398 and to, therefore, make the output signal of the controller 10 containing offset equal to the level of the fluid pressure manually produced by the adjustment of a fluid pressure regulator 184.

FIG. 16 shows a manual-to-automatic, horizontally positioned transfer lever 152 moved to its automatic A position and further shows the amount of control offset still remaining in the controller while the aforementioned bumpless switching from manual M to automatic A operation is effected in going from the lever, pointer and thumb wheel positions shown in FIGS. 14—16.

CONTROLLERS WITH NO OFFSET
(FIGS. 17—23)

FIG. 17 is a view showing the position in which the nulling, setpoint, process variable pointers 22, 100, 118, 22', 100', 118', the vertically positioned nulling setpoint manual-to-automatic and manual-to-cascade switching levers 152, 152' and the manually adjustable thumb wheels 186, 186', 54 will be located on the face of the primary and secondary indicating-controlling apparatus 10, 236 shown in FIG. 2 when this apparatus is in a manual position and the controllers have zero offset.

FIG. 18 shows the first step in bumplessly switching from manual M to a cascade C position is to adjust the horizontally positioned thumb wheel 186 of the secondary controller 236 to give the desired process variable value.

FIG. 19 shows the desired zero deviation position that the deviation pointer 148' of the secondary indicating controller will be in with respect to the thin portion 396' of its associated opaque stationary index band 398' after the horizontal thumb wheel 186 of the primary controller 10 has been manually adjusted.

FIG. 20 shows the horizontally positioned, manually operated switching lever 152' of the secondary indicating controller shifted to a cascade positon C which provides secondary automatic control 236 with remote setpoint.

FIG. 21 shows in solid-line form the horizontal thumb wheel 186 of the primary indicating controller 10 of FIG. 1 being adjusted while it is in a secondary automatic positon and an alternative lined-out, dotted-line setpoint process variable pointer position 100', 118' to which the secondary indicating controller 236 can be adjusted if desired while it is in this position by adjusting the vertically positioned setpoint thumb wheel 54.

FIG. 22 shows the desired zero deviation position that the deviation pointer 148 of the primary indicating controller 10 will be in with respect to a thin portion 396 of its associated stationary index band 398 after the vertical thumb wheel adjustment 54 of the primary controller 10 has been manually adjusted and the dotted-line position of the secondary indicating controller setpoint and process variable pointers 100', 118' represent the alternative position for these pointers.

FIG. 23 shows the horizontally positioned, manually operated switching lever 152 of the primary indicating controller 10 shifted to an automatic position A and a dotted-line position of the secondary indicating controller setpoint and process variable pointers representing the alternative positions for these pointers and the system is in cascade C control.

CONTROLLERS WITH OFFSET
(FIGS. 24—30)

FIG. 24 is the same as that described under FIG. 17.

FIG. 25 is the same as that described under FIG. 18.

FIG. 26 differs from 25 in that the nulling lever 221 is pulled down similar to the manner previously described under FIG. 15.

FIG. 27 is similar to the description of FIG. 20, except that it shows offset.

FIG. 28 is similar to the description of FIG. 21, except that it shows offset.

FIG. 29 differs from FIG. 22 in that the nulling lever 22 of the primary controlling apparatus 10 is pulled down for the same purpose as that described under FIG. 15.

FIG. 30 shows the controllers with offset and now switched in the same unique bumpless manner while in cascade C in the same manner as that disclosed in FIGS. 14—16.

FIG. 24—30 thus show that, even though a controller has offset, it is for the first time able to be as bumplessly switched with the apparatus disclosed herein while in cascade as a controller containing no offset such as was disclosed in FIG. 23.

I claim:

1. An indicating apparatus comprising a scale, a transparent face member spaced from and covering the scale, said transparent face member having a stationary opaque index band extending in a direction across the scale and containing a necked portion between its ends, a pointer having an elongated opaque portion that is substantially equal to the widest width of the band and terminating in an opaque triangular shape pointed end portion, said pointer being operably connected for movement along the scale and between the face member and the scale, said opaque pointed end portion of the pointer being aligned for movement past and in opposite directions away from the necked portion of the index band, the opaque index band being constructed to obscure all but the part of the pointed end portion of the pointer that is not covered by the necked portion when the pointer is moved into alignment with the opaque band to thereby provide a means of indicating the existence of the pointer behind the band.